United States Patent
Sedarat

(10) Patent No.: US 10,735,048 B1
(45) Date of Patent: *Aug. 4, 2020

(54) NETWORK SWITCH APPARATUS AND METHODS FOR GLOBAL ALIEN CROSSTALK CHARACTERIZATION, DIAGNOSTICS AND NETWORK OPTIMIZATION

(71) Applicant: Aquantia Corporation, San Jose, CA (US)

(72) Inventor: Hossein Sedarat, San Jose, CA (US)

(73) Assignee: Marvell Asia Pte, LTD, Singapore (SG)

( * ) Notice: Subject to any disclaimer, the term of this patent is extended or adjusted under 35 U.S.C. 154(b) by 65 days.

This patent is subject to a terminal disclaimer.

(21) Appl. No.: 14/961,806

(22) Filed: Dec. 7, 2015

Related U.S. Application Data

(60) Provisional application No. 62/088,524, filed on Dec. 5, 2014.

(51) Int. Cl.
*H04B 3/487* (2015.01)
*H04B 3/32* (2006.01)

(52) U.S. Cl.
CPC ............... *H04B 3/487* (2015.01); *H04B 3/32* (2013.01)

(58) Field of Classification Search
CPC .................................. H04B 3/487; H04B 3/32
See application file for complete search history.

(56) References Cited

U.S. PATENT DOCUMENTS

| | | | |
|---|---|---|---|
| 6,057,743 A | 5/2000 | Aekins | |
| 6,160,790 A | 12/2000 | Bremer | |
| 6,201,796 B1 | 3/2001 | Agazzi et al. | |
| 6,208,671 B1 | 3/2001 | Paulos et al. | |
| 7,081,763 B1* | 7/2006 | Zhu | H04B 3/487 324/539 |
| 7,177,283 B2 | 2/2007 | Fukae et al. | |
| 7,236,463 B2 | 6/2007 | Lai | |
| 7,346,012 B2 | 3/2008 | Stopler | |
| 7,701,867 B2 | 4/2010 | Bui | |
| 7,720,075 B2 | 5/2010 | Costo | |
| 7,881,322 B1 | 2/2011 | Benveniste | |
| 7,983,289 B2 | 7/2011 | Yamanaka et al. | |
| 8,271,807 B2 | 9/2012 | Jackson | |
| 8,274,894 B2 | 9/2012 | Kneckt et al. | |
| 8,335,937 B2 | 12/2012 | Qi et al. | |
| 8,659,986 B1 | 2/2014 | Martinson et al. | |
| 2005/0042931 A1 | 2/2005 | Lavie | |
| 2006/0182014 A1* | 8/2006 | Lusky | H04B 3/23 370/201 |

(Continued)

FOREIGN PATENT DOCUMENTS

WO  WO 2011/056970 A2  5/2011

*Primary Examiner* — Rina C Pancholi

(57) ABSTRACT

An Ethernet network switch is disclosed. The network switch includes multiple Ethernet ports, each port including Ethernet transceiver circuitry forming one end of an Ethernet link. The switch also includes control logic to, when the switch is connected to multiple Ethernet cables defining Ethernet links, 1) initiate a diagnostic mode of operation, 2) control at least two of the multiple Ethernet links to measure a parameter associated with alien crosstalk, and 3) configure operation parameters for the links based on the measured parameter.

19 Claims, 3 Drawing Sheets

(56) References Cited

U.S. PATENT DOCUMENTS

| | | |
|---|---|---|
| 2006/0203742 A1* | 9/2006 | Bui .................... H04L 43/50 |
| | | 370/252 |
| 2007/0064151 A1 | 3/2007 | Chang et al. |
| 2007/0192505 A1* | 8/2007 | Dalmia ............... H04L 5/1446 |
| | | 709/233 |
| 2007/0248024 A1 | 10/2007 | Conway et al. |
| 2010/0135374 A1* | 6/2010 | Kozek ................. H04M 3/304 |
| | | 375/227 |
| 2010/0156437 A1* | 6/2010 | Cobb ................. G01R 31/021 |
| | | 324/614 |
| 2011/0286391 A1 | 11/2011 | Chen et al. |
| 2011/0292977 A1 | 12/2011 | Farjadrad |
| 2011/0317564 A1* | 12/2011 | Saibi ................. H04L 12/2697 |
| | | 370/249 |
| 2012/0051240 A1 | 3/2012 | Dwivedi et al. |
| 2012/0195227 A1 | 8/2012 | Vedantham et al. |
| 2015/0155914 A1* | 6/2015 | Wahibi .................... H04B 3/32 |
| | | 370/201 |

* cited by examiner

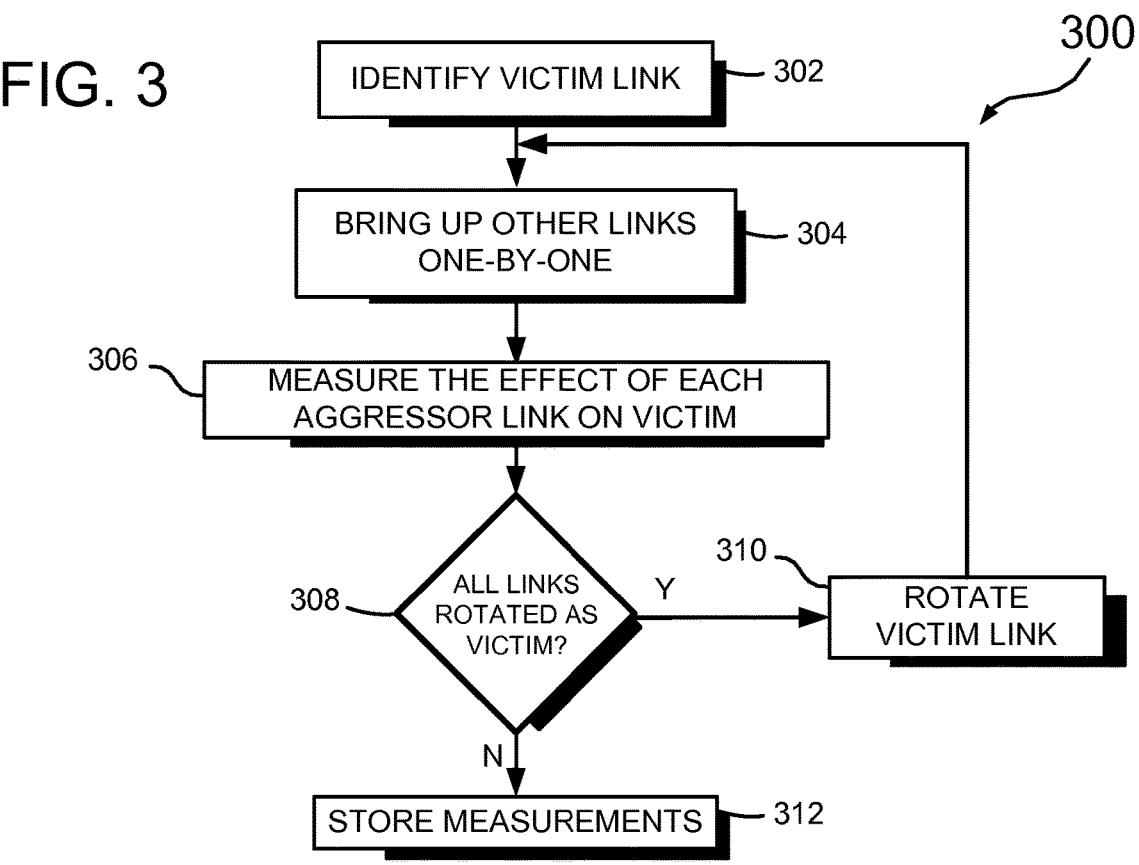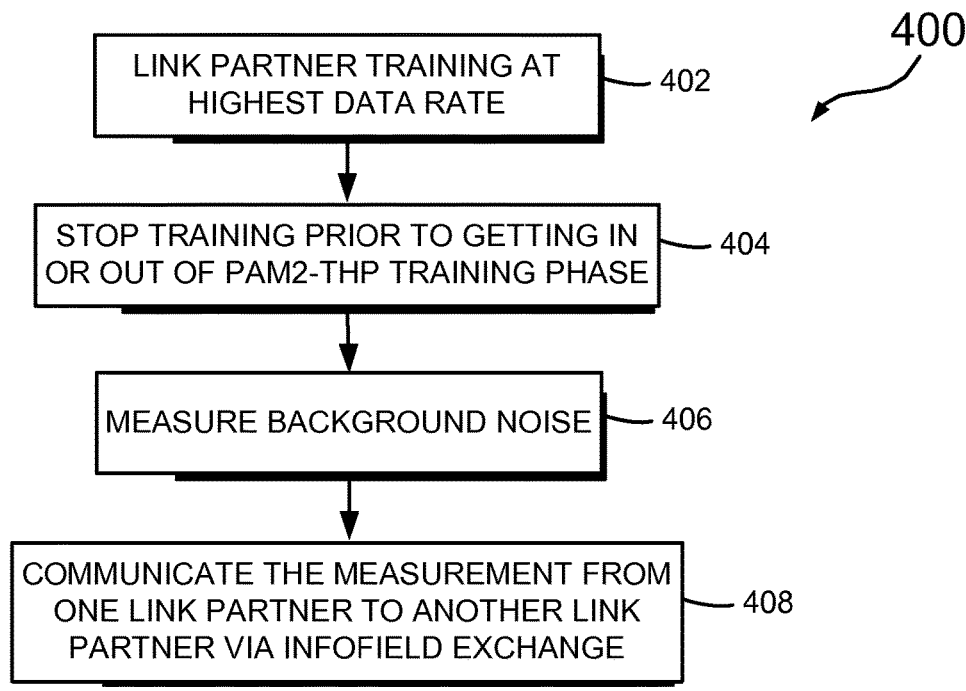

NETWORK SWITCH APPARATUS AND METHODS FOR GLOBAL ALIEN CROSSTALK CHARACTERIZATION, DIAGNOSTICS AND NETWORK OPTIMIZATION

CROSS-REFERENCE TO RELATED APPLICATIONS

This application is a Non-Provisional that claims priority to U.S. Provisional Application No. 62/088,524, filed Dec. 5, 2014, entitled ALIEN CROSSTALK CHARACTERIZATION AND DIAGNOSTICS, which is incorporated herein by reference in its entirety.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e at higher rates poses challenges such as alien crosstalk.

The Ethernet network in an enterprise environment includes many point-to-point data links. A signal on one data link may cause alien crosstalk noise into another adjacent link. CAT5e cable is generally not standardized for alien crosstalk, and the operating behavior typically varies widely from cable to cable and setup to setup. Attempting to diagnose an existing network cable run for alien crosstalk using conventional apparatus and methods is often problematic. Alien crosstalk creates interdependencies between various links of a network. In other words, it may not be possible to optimize the performance of a link in isolation and without considerations of other links in that network. In such an environment, the links have to be optimized together. Given the unpredictability of alien crosstalk environment optimizing the overall throughput of a network may become a challenging problem.

In an effort to diagnose existing Ethernet networks for crosstalk, Information Technology (IT) operators typically utilize test equipment that includes connection ports to connect the remote ends of the various Ethernet cables that define the links of the network. Practically speaking, however, deployed Ethernet network cables are often run through walls or ceilings to separate areas to connect to, for example, computers, network printers, access devices and the like. Thus it is very difficult to successfully connect all network cables to a given test apparatus to diagnose alien crosstalk on a global network scale.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3 illustrates a flowchart of steps for one embodiment of a method for characterizing alien crosstalk between a victim link and an aggressor link.

FIG. 4 illustrates a flowchart of steps for one embodiment of a method for characterizing an entire crosstalk environment in the Ethernet network of FIG. 1.

DETAILED DESCRIPTION

Embodiments of apparatus and methods for global alien crosstalk characterization, diagnostics and network optimization for Ethernet networks are disclosed. In one embodiment, an Ethernet network switch is disclosed that includes multiple Ethernet ports, each port including Ethernet transceiver circuitry forming one end of an Ethernet link. The switch also includes control logic to, when the switch is connected to multiple Ethernet cables defining Ethernet links, 1) initiate a diagnostic mode of operation, 2) control at least two of the multiple Ethernet links to measure a parameter associated with alien crosstalk, and 3) configure operation parameters for the links based on the measured parameter. Having the ability to measure a parameter associated with alien crosstalk among the network links, utilizing the link circuitry to perform the measurements, provides significant improvements in diagnostic capabilities and efficiencies for network administrators.

Figure 1:
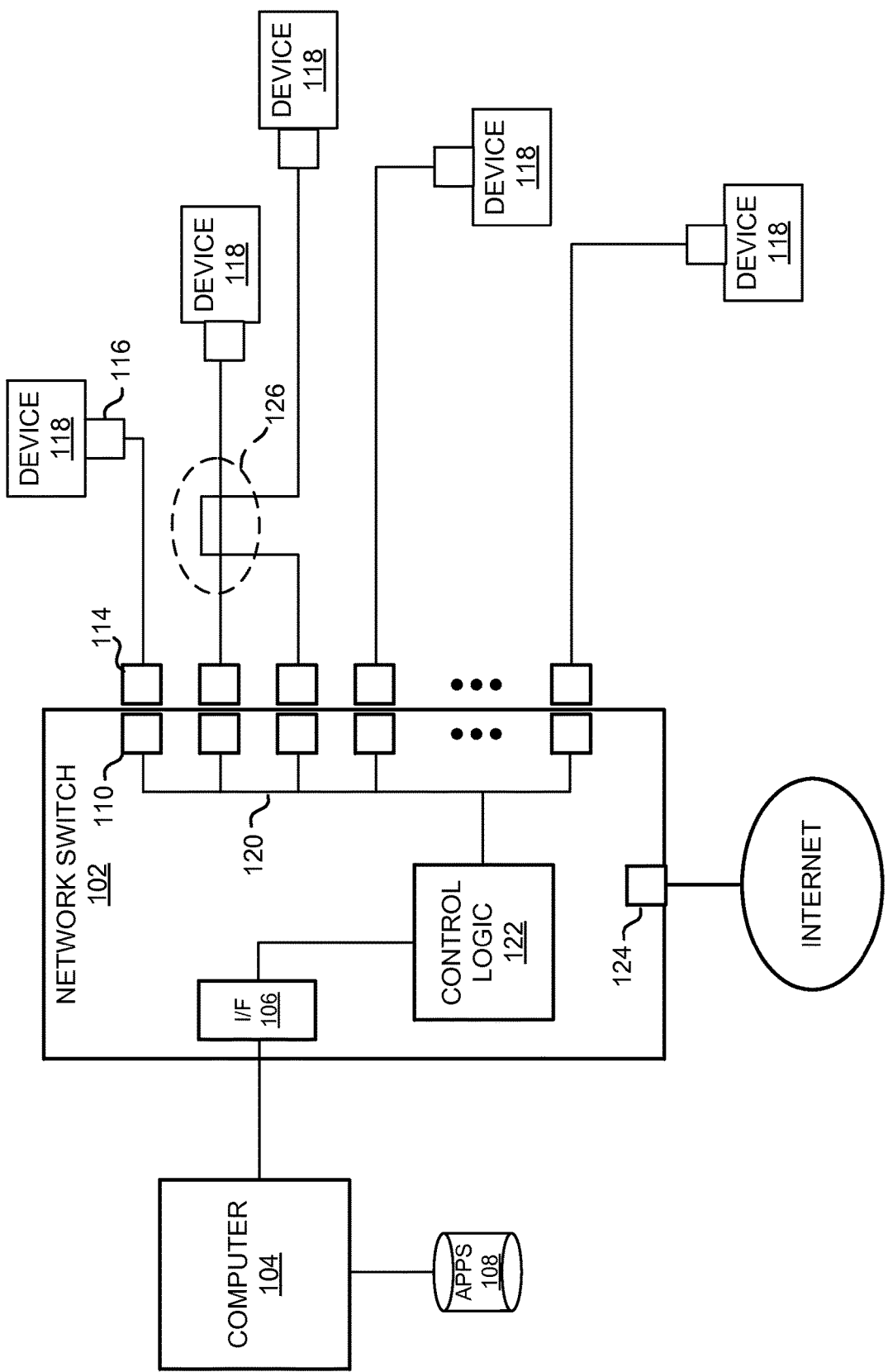
FIG. 1 illustrates an Ethernet network architecture including a network switch coupled to multiple Ethernet links.

FIG. 1 illustrates an Ethernet network architecture, generally designated 100. A network switch 102 interfaces with a computer 104 via an interface circuit 106. The computer may be local to the network, or remote, such that the network switch may be controlled via Information Technology (IT) personnel. The computer executes instructions associated with network applications, including diagnostics software, that are stored in memory 108. The diagnostics software provides a methodology for the switch to carry out diagnostic processes, more fully described below.

Further referring to FIG. 1, the network switch 102 includes multiple Ethernet ports 110 corresponding to individual Ethernet links. The network switch may include, for example, forty-eight ports to support an equal number of links. Each port connects to a local end 112 of an Ethernet cable 114. The remote end 116 of each cable connects to a network device 118, such as a computer, network printer, access node, or the like. Further details regarding each Ethernet link are described below with respect to FIG. 2.

With continued reference to FIG. 1, for one embodiment, each Ethernet port 110 on the network witch 102 communicates to every other port via a signal bus 120. Control logic 122 on the network switch couples to the signal bus 120, and manages coordination between the circuits associated with each port. The network switch may also include an Internet port 124 that provides Internet access to the various Ethernet links.

Figure 2:
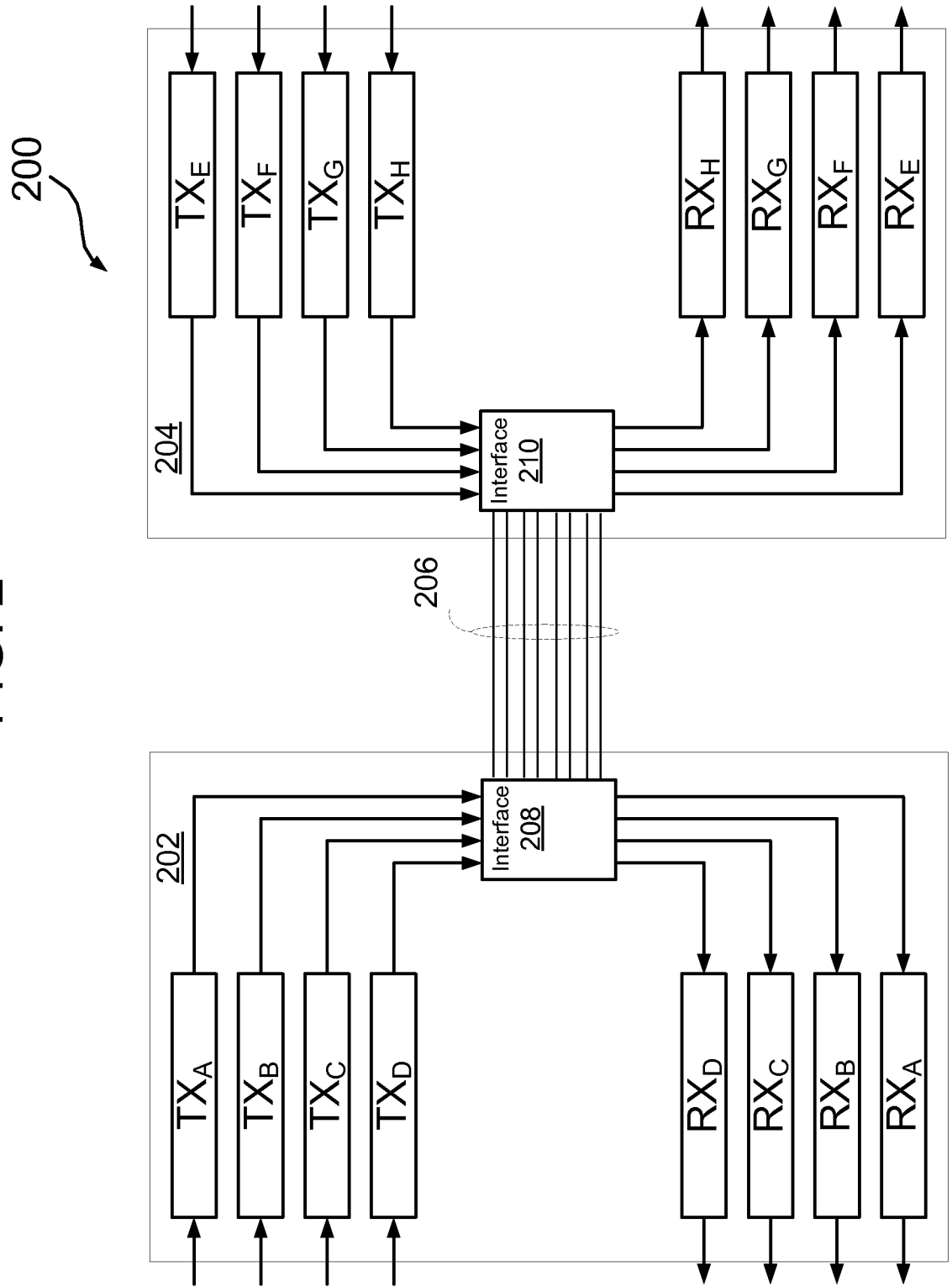
FIG. 2 illustrates a high-level transmitter/receiver (transceiver) channel architecture for each of the Ethernet links of FIG. 1.

FIG. 2 is a block diagram illustrating one embodiment of an Ethernet link that may be employed in the network of FIG. 1. The link includes a first transceiver integrated circuit (IC) or chip 202 and a second transceiver chip 204 that can communicate with each other. The first transceiver 202 includes "transceiver components" including one or more transmitters $TX_A$-$TX_D$ and one or more receivers $RX_A$-$RX_D$. Similarly, the second transceiver 204 includes various transceiver components including one or more transmitters $TX_E$-

$TX_H$ and one or more receivers $RX_E$-$RX_H$. The transmitters $TX_A$-$TX_H$ shown in FIG. 2 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" (such as the network switch of FIG. 1) associated with each respective transceiver which wants to communicate data over the communication network. For example, the transmitters receive data and control signals from the controller connected to the first transceiver 202 in order to send the data over the network to other transceivers and controllers, while the receivers receive data from other transceivers and controllers via the network in order to provide the data to the controller connected to the first transceiver 202.

The first transceiver chip 202 can communicate with the second transceiver chip 204 over one or more communication channels of a communication link 206. In one embodiment, such as one similar to the 10GBASE-T Ethernet standard, four communication channels are provided on the communication link 206, each channel including a twisted pair cable. Thus, in that standard, there are four transmitters TX and four corresponding receivers RX provided in each of the transceivers 202 and 204, each transmitter associated with one of the local near-end receivers in the same transceiver, and each such transmitter/receiver pair dedicated to one channel used for duplex communication. A transmitter/receiver pair in the first transceiver 202 communicates across a channel of the link 206 to a far-end transmitter/receiver pair in the second transceiver 204. A transmitter TX and a receiver RX that are connected to the same channel/link, or two transceivers connected by the communication link 206, are considered "link partners."

An interface 208 can be provided in the first transceiver chip 202 and an interface 210 can be provided in the second transceiver chip 204 to allow data transmissions between the transceivers to be routed to the appropriate transceiver blocks. For example, the interfaces 208 and 210 can include transformers, and circuitry used for directing signals or data (alternatively, some or all circuitry can be included in other components, such as transmitters TX and receivers RX).

In one example, from the point of view of the first transceiver chip 202, data transmissions during a normal or regular operation mode from a local transmitter TX are provided to the interface 208, which outputs the data on a corresponding channel of the communication link 206. The data is received by the link partner, the second transceiver chip 204. The interface 210 of the transceiver 204 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 2 utilize thousands of such deployments, resulting in complex crosstalk environments. For instance, in many circumstances such as the network of FIG. 1, a commercial building or residence employs existing Ethernet cable throughout various walls and ceilings in order to establish each link from a given remote location in the building (such as a switch plate in a given office), to the centralized location of the network switch. The original routing of the cables may be such that one or more cables cause alien crosstalk interference affecting one or more other cables. This is shown in FIG. 1, at 126.

The Ethernet links of FIG. 2, which are employed in the network of FIG. 1 operate at very high data rates, as high as 10 Gbps. Links that are exposed to alien crosstalk may not be able to operate at such high data rates, and may need to have their data rates reduced in order to have an acceptable signal-to-noise ratio (SNR) for data transfers. Quickly and efficiently diagnosing an entire network environment is thus an important capability for an IT Administrator.

FIG. 3 illustrates one embodiment of a method, generally designated 300, for characterizing an entire crosstalk environment in an Ethernet network. The method may be controlled by the external computer 104 or via the control logic 122 in accordance with software corresponding to the applications 108. In one embodiment, control of the process may be coordinated by a selected one of the local Ethernet link transceiver circuits disposed in the network switch 102. The coordinating transceiver may communicate with other local transceivers in the network switch via the signal bus 120 through an appropriate protocol. Coordination with remote link partners may be carried out via a protocol such as an Infofield exchange protocol. One embodiment of such a protocol is described in copending U.S. patent application Ser. No. 14/961,797, titled "NBASE-T PHY-TO-PHY INFORMATION EXCHANGE METHOD AND APPARATUS", filed Dec. 7, 2015, assigned to the assignee of the instant application, and expressly incorporated herein by reference.

Further referring to FIG. 3, the coordinating entity (either the computer or one of the local transceivers) identifies one or more victim links, at 302. The other links of the network may be brought online as aggressor links, one-by-one, at 304, to a predetermined operational capacity. As each aggressor link is brought online, the alien crosstalk effect of each aggressor link on the victim is measured, at 306, such as through a measurement technique described below with respect to FIG. 4. Similarly, the link partner of the victim is also brought online so that the insertion loss of the victim channel is also characterized.

Once the measurement is made, at 306, a determination may then be made, at 308, as to whether all of the links have played the role of "victim" in the characterization process. If not all of the links have been characterized as a victim, then a new link may be rotated into the victim role, at 310, and the bringing up of the other links and associated measurements are repeated. Once all of the links have been rotated through as a "victim" link, then the process may stop. This extensive set of measurements may be stored in a database and used by the application software in many ways to optimize the network. Some examples include limiting the data rate on certain links such that the overall performance and throughput of the entire network is optimized, re-routing certain network cables to minimize the alien interference, or re-assigning port assignments for certain links.

In general, the crosstalk between two links may be excessive because of some fault in the cabling layout. An alien crosstalk channel may be identified by utilizing the signal processing circuitry already resident in the physical layer of an Ethernet link, such as an NBASE-T Ethernet transceiver to carry out an alien crosstalk measurement. Once a parameter indicating the presence of alien crosstalk is measured, (such as the PSD, SNR, or impulse response of the alien crosstalk channel) or estimated, the location of the cable plant with the excessive crosstalk may be identified.

Referring now to FIG. 4, one embodiment of a method to measure the alien crosstalk, corresponding to step 306 of FIG. 3, provides a mode of operation in an Ethernet transceiver that can characterize alien crosstalk from any aggressor link to a particular victim link in an enterprise environment. At 402, link partners associated with the victim link and the aggressor link initiate a training process at a highest data rate possible. For some embodiments, such as those where the link partners meet 10GBASE-T standards, the highest data rate may be 10 Gbps.

Further referring to FIG. 4, the training process may eventually include a PAM2-THP training phase. Prior to entering or exiting the PAM2-THP training phase, a coordinated Infofield exchange may be carried out to stop the training process, at 404, and enter a diagnostic mode of operation. At this point, the link partners may measure background signal characteristics, at 406. The background signal shows the effect of alien crosstalk and other sources of noise and disturbance. For some embodiments, the measurement may result in a single value indicating the entire power of the measured noise, or across frequency as a value indicating the power spectral density (PSD) of the noise. Other embodiments may involve generating an impulse response of the alien crosstalk channel. Embodiments of methods and apparatus to carry out such measurements are described in copending U.S. patent application Ser. No. 14/961,802, titled "ON-CHIP ALIEN CROSSTALK CHARACTERIZATION AND DIAGNOSTICS", filed Dec. 7, 2015, assigned to the assignee of the instant application, and expressly incorporated herein by reference. Following the noise measurement, the value may be communicated from one link partner to the other through another protocol or a data exchange through the Infofield protocol, at 408.

For some embodiments, the signal measurement can be performed while other crosstalking links are actively operating. In such cases, the background noise measurement on the link partners of a victim link identifies the overall crosstalk noise contributed from all other links in the network. This information on alien crosstalk environment along with the measurement on insertion loss of each link may be used by the application software associated with the network switch (FIG. 1) to optimize the overall network. For instance, when the insertion loss channels and alien crosstalk channels associated with a victim link and a set of aggressors are identified, the PHY operating SNR of the victim link may be identified by calculating the Salz SNR for all combination of aggressors rates and transmit powers. The capacity of the victim link may be increased if the transmit power of the one or more of the aggressors is reduced. Similarly, a reduction in the data rate of the aggressors which typically results in lower transmit signaling bandwidth also boost the capacity of the victim link. Given the complete information for alien crosstalk and insertion loss channels the network operation may be globally optimized. This may mean limiting the data rate on some links, limiting the transmit power for one or more links, or otherwise vary any of several operating parameters based on the obtained information on alien crosstalk and insertion loss. The information on insertion loss and alien crosstalk channels may also be used by the network manager to reconfigure the cables for improved over all network performance.

The network optimization criterion may vary depending on the application. For instance, a network manager may desire a maximum total throughput for all links in the network. Additionally, there may be some constraints such as minimum rate requirements for some links in the network. Knowing the insertion loss and alien crosstalk channels in the network is the basic information needed to solve these optimization problems.

In one embodiment, the network switch of FIG. 1 may be utilized to quickly "qualify" or confirm that certain Ethernet network cables meet minimum standards for alien crosstalk suppression. For example, many existing cable designs, such as CAT5E, do not adhere to crosstalk suppression standards for certain data rates. The cables in a network are often bundled together. At high data rates, such a cable configuration may be especially susceptible to alien crosstalk if not designed with suppression features (such as additional shielding, etc.). The network switch 102 may be employed to thus certify the cables either prior to installation, or while already installed. Cables that fail the certification may either be replaced, or the network capabilities reduced to account for the characterized environment. This is straightforwardly accomplished, as described above, without the need to connect the remote ends of the cables in a unified measuring device.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An Ethernet network switch comprising:
    network switch circuitry including
        multiple Ethernet ports, each port including local Ethernet transceiver circuitry forming one end of an respective Ethernet link of multiple Ethernet links;
        control logic to, when the network switch circuitry is connected to multiple network devices via respective Ethernet links, 1) initiate a diagnostic mode of operation, 2) while in the diagnostic mode of operation, control at least two of the multiple Ethernet links in an aggressor and victim relationship to perform respective link training sequences to detect a measured parameter associated with alien crosstalk, the alien crosstalk comprising noise from an aggressor Ethernet link to a victim Ethernet link and noise that is external to respective ones of the at least two of the multiple Ethernet links and 3) operate in a data transfer mode of operation with the multiple Ethernet ports operating in a normal networking state.

2. The Ethernet network switch of claim 1, wherein the control logic is further operable to 4) configure operation parameters for the multiple Ethernet links based on the measured parameter.

3. The Ethernet network switch of claim 1, wherein the measured parameter is measured by the local Ethernet transceiver circuitry of at least one of the multiple Ethernet links.

4. The Ethernet network switch of claim 1, wherein the diagnostic mode of operation occurs following completion of a training mode of operation.

5. The Ethernet network switch of claim 1, wherein the control logic selects one of the local Ethernet transceiver circuitry to coordinate the measuring of the parameter associated with the alien crosstalk.

6. The Ethernet network switch of claim 1, wherein the measured parameter comprises at least one from the group comprising a power parameter, signal-to-noise ratio (SNR), Salz SNR and an impulse response.

7. A method of operation in an Ethernet network switch, the method comprising:
    initiating a diagnostic mode of operation for a group of Ethernet links coupled to the Ethernet network switch, each Ethernet link of the group of Ethernet links coupling the Ethernet network switch to a respective separate network device;
    selecting a first Ethernet link from the group of Ethernet links as an aggressor link;
    selecting at least one other Ethernet link from the group of Ethernet links as a victim link;
    performing a link training sequence while in the diagnostic mode of operation;
    measuring a signal parameter associated with alien crosstalk during the link training sequence, the alien crosstalk comprising noise from the aggressor link to the victim link and noise that is external to respective ones of the first Ethernet link and the at least one other Ethernet link, the measuring carried out by circuitry in the victim link; and
    exiting the diagnostic mode of operation to operate in a normal networking mode of operation.

8. The method of claim 7, further comprising:
    configuring operation parameters for the victim link based on the measured signal parameter, the operation parameters employed during data transfer operations with the victim link in an online mode of operation.

9. The method of claim 7, further comprising: rotating each of multiple Ethernet links as a victim link, and measuring the signal parameter for each of the rotated victim links.

10. The method of claim 9, further comprising:
    storing the measured signal parameters in memory.

11. The method of claim 7, wherein the measuring the signal parameter comprises at least one from the group comprising measuring a power parameter, measuring a (Salz) signal-to-noise ratio (SNR) and measuring an impulse response.

12. The method of claim 7, further comprising: initiating a training mode of operation; and initiating the diagnostic mode of operation after initiating the training mode of operation.

13. The method of claim 7, further comprising: qualifying the at least one other Ethernet link for use at a predefined data rate based on the measured signal parameter.

14. A non-transitory computer-readable medium storing instructions that, when executed by one or more processors of an Ethernet network switch, cause the one or more processors to:
    initiate a diagnostic mode of operation for a group of Ethernet links coupled to the Ethernet network switch, each Ethernet link of the group of Ethernet links being configured to couple the Ethernet network switch to a respective separate network device;

select a first Ethernet link from the group of Ethernet links as an aggressor link;

select at least one other Ethernet link from the group of Ethernet links as a victim link;

perform a link training sequence while in the diagnostic mode of operation;

measure a signal parameter associated with alien crosstalk during the link training sequence, the alien crosstalk comprising noise from the aggressor link to the victim link and noise that is external to each of the first Ethernet link and the at least one other Ethernet link, the measuring carried out by circuitry in the victim link; and exit the diagnostic mode of operation to operate in a normal networking mode of operation.

15. The non-transitory computer-readable medium according to claim 14, further comprising instructions that, when executed by the one or more processors, cause the one or more processors to:

configure operations for the victim link based on the measured signal parameter, the operations employed during data transfers with the victim link in an online mode of operation.

16. The non-transitory computer-readable medium according to claim 14, further comprising instructions that, when executed by the one or more processors, cause the one or more processors to:

rotate each of multiple Ethernet links as a victim link, and measuring the signal parameter for each of the rotated victim links.

17. The non-transitory computer-readable medium according to claim 14, further comprising instructions that, when executed by the one or more processors, cause the one or more processors to:

store the measured signal parameter in memory.

18. The non-transitory computer-readable medium according to claim 14, further comprising instructions that, when executed by the one or more processors, cause the one or more processors to:

initiate a training mode of operation; and initiate the diagnostic mode of operation after initiating the training mode of operation.

19. The non-transitory computer-readable medium according to claim 14, further comprising instructions that, when executed by the one or more processors, cause the one or more processors to:

qualify the at least one other Ethernet link for use at a predefined data rate based on the measured signal parameter.

* * * * *